RADIO TRANSMISSION SYSTEM

Filed Jan. 24, 1949

INVENTOR
Ray D. Kell
BY
[signature]
ATTORNEY

Patented June 10, 1952

2,599,643

UNITED STATES PATENT OFFICE 2,599,643

RADIO TRANSMISSION SYSTEM

Ray D. Kell, Princeton, N. J., assignor to Radio Corporation of America, a corporation of Delaware Application January 24, 1949, Serial No. 72,386

6 Claims. (Cl. 250—6)

This invention relates to radio transmission systems in which two or more geographically separated radio transmitters are to maintain a fixed frequency relationship between their respective carriers, and more particularly to radio transmission systems wherein two or more geographically separated radio transmitters are to transmit radio carriers having a common frequency and bearing and isochronous relationship with one another.

The present invention concerns itself more directly with a carrier synchronization system for a plurality of television transmitters operating on a common carrier frequency located at different geographical locations but positioned sufficiently close to one another to produce reception zones in which the common frequency carrier signals from one transmitter measurably influence and interfere with the satisfactory reception of another common frequency carrier signal.

As the television art has progressed, there has arisen the desire to construct greater numbers of television transmitting stations in a given geographical area, particularly around centers of large population. Inasmuch as the frequency allocations for television service are limited in number, it has been often necessary to assign to transmitters serving a common area, a common television channel. Although an effort has been made to carefully select the geographical locations of such co-channel stations to minimize the population in zones likely to suffer from co-channel interference, there exists an ever increasing number of television receiver owners who suffer disturbances from such interference.

Many efforts have been extended to minimize such interference by utilizing directive antennas at the receiving locations so as to directively discriminate against the unwanted carrier by proper orientation of the antenna. However, even with the most carefully adjusted and elaborate antenna arrays, there still remain areas in which satisfactory reception of one television station during the operation of the other is impossible. The interference so produced has been found to be the result of the difference in carrier frequency between the stations, this frequency difference or beat manifesting itself as a series of annoying horizontal bars moving in the vertical direction within the desired picture. These horizontal black bars are apparent in the picture long before the actual interfering picture information appears in the background of the desired picture.

It has been found that this black bar or "venetian blind" interference may be eliminated by synchronizing the radio carriers of the two television stations with one another. For example, through synchronization, it has been found that the potentially interfering signal may be increased in intensity by a factor between 5 and 10 times in voltage without producing serious interference in the desired image.

The present invention provides a method for establishing isochronism between two interfering common channel television transmitter carriers by separately monitoring the two carriers at a geographical position between the two television transmitters. At the monitoring position, the frequency and phase of the carriers are compared to produce a control voltage suitable for transmission over a commercial telephone line to one of the co-channel transmitters. This control voltage is then utilized to automatically control the frequency of the one transmitter so as to be in isochronism with the carrier signal of the other transmitter.

It is therefore an object of the present invention to provide an improved method for synchronizing the carriers of two radio transmitters assigned for operation on a common transmission frequency.

It is another object of the present invention to provide a new and novel method for automatically synchronizing the radio carriers of two television transmitters assigned for operation on a single television channel so as to extend the effective service areas of the stations involved.

It is a further object of the present invention to provide an automatic carrier synchronization system for two television transmitters assigned for operation on a common television channel wherein the synchronizing control exercised over one transmitter is derived from a monitoring location between the two transmitters involved, to produce automatic control information suitable for transmission over existing commercial telephone facilities.

The invention possesses numerous other objects and features of advantage some of which, together with the foregoing, will be set forth in the following description of specific embodiments utilizing the novel method of the present invention. It is therefore to be understood that the present invention is applicable to other apparatus and systems and that its utility is in no way limited to the specific embodiments of the present application as other advantageous embodiments in accordance with the present invention as set forth in the appended claims will occur to those skilled in the art after having benefited from the teachings of the following description especially when taken in connection with the following drawings in which:

Figures 1, 2:
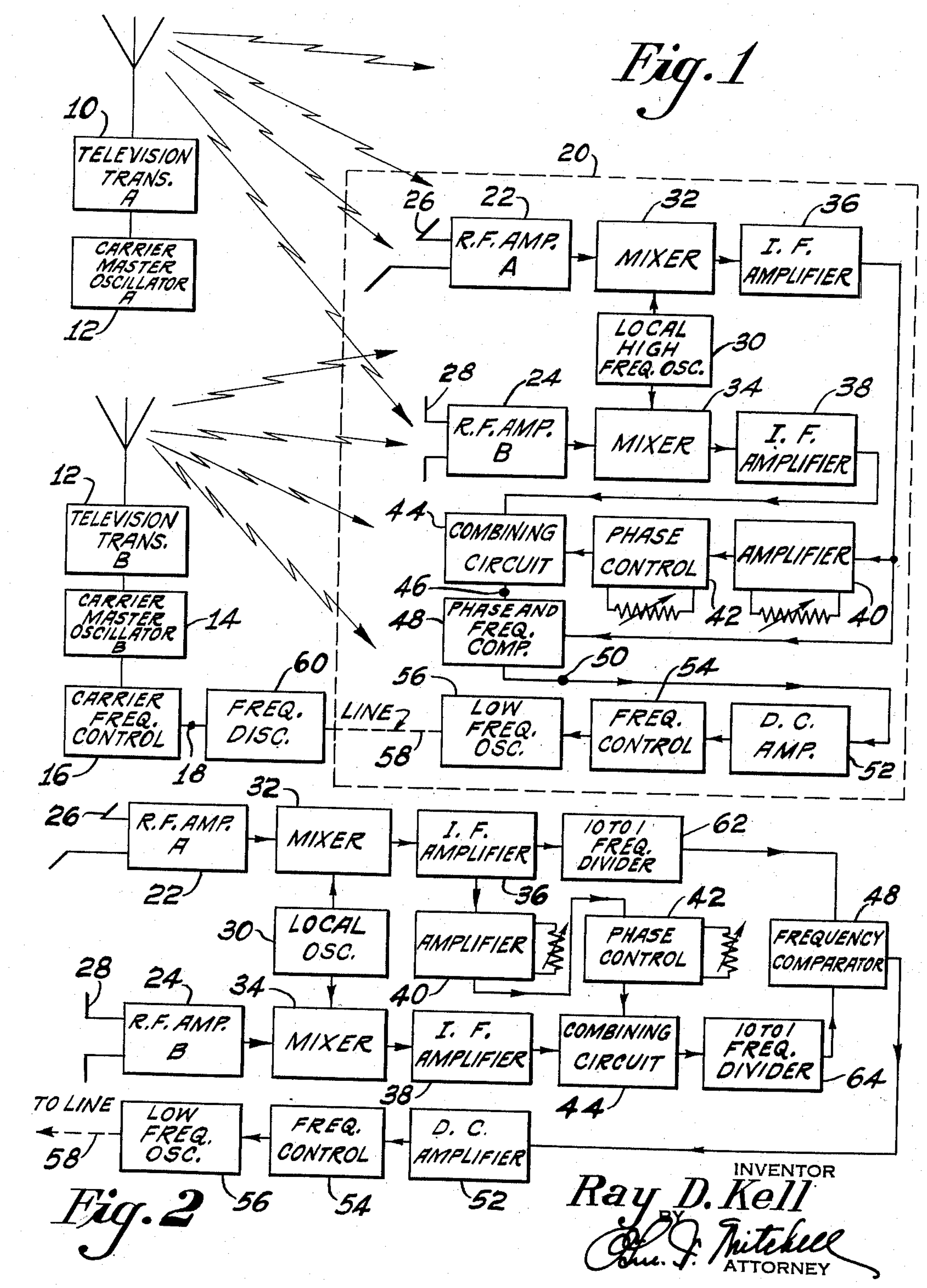
Figure 1 is a block diagram representation of the present invention as applied to a television transmission system.
Figure 2 is a modification of the arrangement shown in Figure 1.

Referring now to Figure 1, there are shown at 10 and 12 respectively two geographically separated television transmitters A and B assigned for operation on a common television channel. It will be assumed that the carrier frequency of the television transmitter A is established by a carrier master oscillator such as 12 and with the exception of the normal drifting of such an oscillator is substantially constant in frequency. Television transmitter B, on the other hand, is provided with a carrier master oscillator such as 14 which is controllable in frequency and phase by means of a carrier frequency control 16.

The carrier frequency control 16 may take many forms well-known in the art, such as mechanical adjustment of a trimmer capacitance associated with the master oscillator 14 or may take the form of the well-known reactance tube connected in shunt with a resonant circuit associated with the oscillator 14. In the present showing, it will be assumed that the carrier frequency control 16 is operated by means of a unidirectional control potential applied to the terminal 18 thereof.

In order to supply the carrier frequency control 16 with the proper control voltage at the control terminal 18 and thereby maintain isochronism between carriers of the television transmitters A and B, the present invention contemplates the use of a remote monitoring station represented by the components shown in the dotted line area 20. This monitoring station 20 includes a first and second R. F. amplifier 22 and 24, each having a directive antenna 26 and 28 directed for pick up of energy from the respective transmitters 10 and 12. The outputs of the R. F. amplifiers 22 and 24 are then mixed with a local high frequency oscillator 30 by means of mixers 32 and 34 to produce respective intermediate frequencies for amplification by the I. F. amplifiers 36 and 38. Inasmuch as the directive antennas 26 and 28 are not wholly effective in isolating the two carriers for respective amplification by the R. F. amplifiers A and B, there is provided a variable gain amplifier 40 and a variable phase control 42 adapted to handle the output of the I. F. amplifier 36. The output of the phase control 42 is then applied to a combining circuit 44 which is also supplied with the output of I. F. amplifier 38. Therefore, if any of the energy of transmitter A at 10 reaches receiving antenna 28 and is amplified by the R. F. amplifier B to be represented in the output of the I. F. amplifier 38, this interfering component may be effectively cancelled in the combining circuit 44 by proper adjustment of the amplifier 40 and phase control 42. Accordingly, the output at terminal 46 of the combining circuit will substantially represent the I. F. frequency produced by carrier B whereas the output of the I. F. amplifier 36 may be thought of as substantially representing the television transmitter carrier A.

The two I. F. carriers are then applied to a frequency comparator circuit such as 48 which produces a D. C. output voltage at terminal 50 which is a function of the frequency difference between the two received carriers. This D. C. voltage is then amplified by D. C. amplifier 52 and applied to a frequency control circuit 54 which exercises control over the frequency of a low frequency oscillator 56. The frequency of the oscillator 56 is selected to permit its transmission over an existing telephone line 58 between the monitoring station 20 and the transmitter 12. The output of the low frequency oscillator as received at the transmitter 12 location is then applied to a frequency discriminator circuit, such as 60, which in turn develops a D. C. output voltage which is a function of the frequency variations in the low frequency oscillator 56. This D. C. output voltage is then applied as a control voltage to the control terminal 18 of the carrier frequency control 16.

With the above arrangement it can be seen that any drift in frequency between the television transmitters A and B will produce a corresponding frequency difference in the output of the I. F. amplifiers 36 and 38. This change will then be reflected as a change in the output voltage of the frequency comparator circuit 48 which in turn will cause the low frequency oscillator 56 to change the frequency of the control signal applied to the line 58. The frequency discriminator 60 at the television transmitter 12 will then respond to this change in frequency and produce a corrective change in the carrier master oscillator 14 by means of the carrier frequency control 16.

With the arrangement in Figure 1, it is apparent that a one-cycle deviation in television transmitter B will produce a one-cycle variation in the intermediate frequency appearing in the output of the amplifier 38 and consequently the frequency comparator circuit 48 will then produce a change in its output voltage corresponding to a one-cycle variation. Since the frequency comparator circuit 48 is also responsive to changes in phase, any variation in the propagation path between the transmitter B and the antenna 28 will also produce a change in the corrective signal produced by the frequency comparator 48. This degree of sensitivity to phase and frequency may cause the loss of control of the system on the television transmitter B for changes in propagation path corresponding to several cycles.

The arrangement in Figure 2 obviates such a difficulty by providing frequency dividers 62 and 64 at the respective outputs of the I. F. amplifiers 36 and the combining circuit 44. These frequency divider circuits may conveniently be of the locked-in oscillator type operating at a submultiple of the I. F. frequencies but held in synchronism therewith. In the illustration of Figure 2, the dividers are shown by way of example to have a 10 to 1 count-down ratio thereby supplying the frequency comparator 48 with comparison frequencies having a value $\frac{1}{10}$ of that shown in Figure 1. Consequently, whereas in Figure 1 the frequency comparator may have had a lock-in range corresponding to only approximately 30 cycles, the arrangement in Figure 2 will multiply that lock-in range by a factor of 10 which will provide a 300 cycle lock-in range from the carrier standpoint. The sensitivity or accuracy of the lock-in can be made the same as in Figure 1 by simply adjusting the overall gain around the frequency control loop. With such an arrangement, erratic behavior of the propagation path will seldom be sufficiently great to cause the control circuit to lose control over the synchronization system. Furthermore, although not shown in either Figures 1 or 2, for sake of illustrative simplicity, it is obvious that a certain degree of limiting action should be incorporated in the amplifiers handling the received signals so as to free the system from response due to changes in amplitude. In this respect the circuit of Figure 2 has considerable advantage in that the frequency divider circuits 62 and 64 will have an excellent limiting or amplitude change isolating influence.

From the foregoing, it can be seen that the applicant has provided a simple, novel and effective carrier synchronization control for radio frequency transmitters which when applied to a television transmission system provides a continuous and quick-acting synchronization control, thereby greatly increasing the service areas of adjacent co-channel television transmitters.

What is claimed is:

1. In a radio transmission system including at least first and second radio transmitters geographically spaced from each other, a carrier frequency control arrangement comprising in combination: control-signal-actuated means for controlling the carrier frequency of the first transmitter; apparatus located at a monitoring position permitting concomitant reception of the carriers of both the first and the second transmitters, a local oscillator of substantially fixed and lower frequency than either the first or second carriers, means for heterodyning each of the received carriers with said local oscillator to produce first and second intermediate frequency signals, a frequency responsive signal comparator circuit which develops a primary control signal in accordance with the frequency difference between said first and second intermediate frequency signals, a regulatory oscillator which generates a regulating signal having a frequency substantially below that of either said first or second intermediate frequency signals, and means for varying the frequency of said regulating signal in accordance with the developed primary control signal; a frequency sensitive circuit which accepts the variable frequency regulating signal and develops a secondary control signal in accordance with variations in frequency thereof, and means for applying said secondary control signal to said first-named means to control the first transmitter's carrier frequency.

2. In a radio transmission system including first and second radio transmitters geographically spaced from each other, a carrier frequency control arrangement comprising in combination: control-signal-actuated means for controlling the carrier frequency of the first transmitter; apparatus located at a monitoring position permitting concomitant reception of the carriers of both the first and the second transmitters, a local oscillator of substantially fixed and lower frequency than either the first or second carriers, means for heterodyning each of the received carriers with said local oscillator to produce first and second intermediate frequency signals, first and second frequency dividing circuits respectively connected for frequency division of the first and second intermediate frequency signals by a fixed factor to produce first and second indicating signals each respectively lower in frequency than, and in synchronism with, the first and second intermediate frequency signals, a frequency responsive signal comparator circuit which develops a primary control voltage having a magnitude which is a function of the frequency difference between said first and second indicating signals, a regulatory oscillator which generates a regulating signal having a frequency substantially lower than that of either said first or second indicating signals, and means for varying the frequency of said regulating signal in accordance with the developed primary control voltage; a frequency discriminator circuit which accepts the variable frequency regulating signal and develops a secondary control voltage in accordance with the frequency variations of said regulating signal, and means for applying said secondary control voltage as a control signal to said controlling means.

3. In a radio transmission system employing at least first and second geographically separated radio transmitters, and wherein there is included means for controlling the carrier frequency of the first transmitter in accordance with the characteristics of an applied control signal, and wherein there is available a monitoring location permitting concomitant reception of the carriers from both the first and second transmitters, a system for carrier frequency control, said system comprising in combination: apparatus located at the monitoring location for directional, concomitant, and discriminatory reception of both the first and second carriers, a local oscillator of substantially fixed and lower frequency than either the first or second carriers, means for heterodyning each of the received carriers with said local oscillator to produce first and second intermediate frequency signals, first and second frequency dividing circuits respectively connected for frequency division of the first and second intermediate frequency signals by a fixed factor in order to produce first and second indicating signals each an integral submultiple of the corresponding intermediate frequency signal, a frequency responsive signal comparator circuit which develops a primary control voltage having a magnitude which is a function of the frequency difference between said first and second indicating signals, a regulatory oscillator which generates a regulating signal having a frequency substantially below that of either said first or second indicating signals, and means for varying the frequency of said regulating signal in accordance with the developed primary control voltage; and means for transmitting said variable frequency regulating signal to said first transmitter location and for applying a signal derived therefrom as a control signal to said carrier frequency controlling means.

4. In a radio transmission system including at least first and second radio transmitters, a carrier frequency control arrangement comprising in combination: control-signal-responsive means for controlling the carrier frequency of the first transmitter, apparatus for receiving the first and second carriers and for heterodyning each of the received carriers with a local oscillator to produce first and second intermediate frequency signals, means for combining a variable-amplitude variable-phase portion of one of said intermediate frequency signals with the other intermediate frequency signal to provide a resultant signal in which interfering energy, derived from the carrier corresponding to said one signal, which may appear in said other signal is cancelled, means for comparing the frequency and phase of the remaining portion of said one signal and of said resultant signal and for developing a control signal in accordance with the frequency and phase difference between the two compared signals, and means for applying the control signal so developed to said first-named means to control the carrier frequency of said first transmitter.

5. In a radio transmission system including at least first and second radio transmitters, a carrier frequency control arrangement comprising in combination: control-signal-responsive means for controlling the carrier frequency of the first transmitter, apparatus for receiving the first and second carriers and for heterodyning each of the received carriers with a local oscillator to produce first and second intermediate frequency signals, means for combining a variable-amplitude variable-phase portion of one of said intermediate frequency signals with the other intermediate frequency signal to provide a resultant signal in which interfering energy, derived from the carrier corresponding to said one signal, which may appear in said other signal, is cancelled, first and second frequency dividing circuits respectively connected for frequency division of the remaining portion of said one signal and of said resultant signal by a fixed factor to produce first and second indicating signals each respectively lower in frequency than, and in synchronism with, said remaining portion of said one signal and said resultant signal, means for comparing the frequency and phase of the first and second indicating signals and for developing a control signal in accordance with the frequency and phase difference between the two compared signals, and means for applying the control signal so developed to said first-named means to control the carrier frequency of said first transmitter.

6. In a radio transmission system including at least first and second radio transmitters geographically spaced from each other, a carrier frequency control arrangement comprising in combination: control-signal-actuated means for controlling the carrier frequency of the first transmitter; apparatus located at a monitoring position permitting concomitant reception of the carriers of the first and the second transmitters, a local oscillator of substantially fixed and lower frequency than either the first or second carriers, means for heterodyning each of the received carriers with said local oscillator to produce first and second intermediate frequency signals, means including a variable gain amplifier and a variable phase control for combining a variable-amplitude variable-phase portion of said second signal with said first signal to provide a resultant signal in which interfering energy, derived from said second carrier, which may appear in said first signal, is cancelled, a frequency-responsive signal comparator circuit which developes a primary control signal in dependence upon the frequency difference between said first and second signals, a regulatory oscillator which generates a regulating signal having a frequency substantially below that of either said first or second signals, and means for varying the frequency of said regulating signal in accordance with the developed primary control signal; a frequency sensitive circuit which accepts the variable frequency regulating signal and developes a secondary control signal in accordance with variations in frequency thereof, and means for applying said secondary control signal to said first-named means to control the first transmitter's carrier frequency.

RAY D. KELL.

REFERENCES CITED

The following references are of record in the file of this patent:

UNITED STATES PATENTS

| Number | Name | Date |
|---|---|---|
| 1,926,169 | Nyguist | Sept. 12, 1933 |
| 2,085,424 | Goddard | June 29, 1937 |
| 2,125,977 | Zworykin | Aug. 9, 1938 |
| 2,190,037 | Neufeld | Feb. 13, 1940 |
| 2,218,636 | Bruckner | Oct. 22, 1940 |
| 2,314,707 | Katzin | Mar. 23, 1943 |
| 2,404,568 | Dow | July 23, 1946 |
| 2,449,174 | O'Brien | Sept. 14, 1948 |

FOREIGN PATENTS

| Number | Country | Date |
|---|---|---|
| 288,714 | Great Britain | Apr. 12, 1928 |
| 735,055 | France | Aug. 13, 1932 |

OTHER REFERENCES

"Synchronized Broadcasting Systems in Upper Austria: Principle of Operation," by the Joint Intelligence Objectives Agency, Washington, D. C. Report No. 59, December 15, 1945.